J. Holland,
Oil Barrel.

№ 46,359.   Patented Feb. 14, 1865.

Witnesses;
Charles Howson
Wm Albert Steel

Inventor;
J. Holland
by his Attorney
H. Howson
per C. Foster

UNITED STATES PATENT OFFICE.

JAMES HOLLAND, OF CONSHOHOCKEN, PENNSYLVANIA.

IMPROVED BARREL FOR HOLDING PETROLEUM AND OTHER OILS.

Specification forming part of Letters Patent No. 46,359, dated February 14, 1865.

*To all whom it may concern:*

Be it known that I, JAMES HOLLAND, of Conshohocken, in the county of Montgomery and State of Pennsylvania, have invented an Improved Oil-Barrel; and I do hereby declare the following to be a full, clear, and exact description of the same, reference being had to the accompanying drawings, and to the letters of reference marked thereon.

My invention consists of a barrel composed of an outer casing and an inner casing, in combination with an intervening body of cement, as described hereinafter, so that the cement shall effectually prevent the escape of the contents of the inner barrel, and the latter shall prevent the contents from coming in contact with and dissolving or otherwise injuriously affecting the cement.

In order to enable others to use my invention, I will now proceed to describe the construction of the same.

Figure 1:
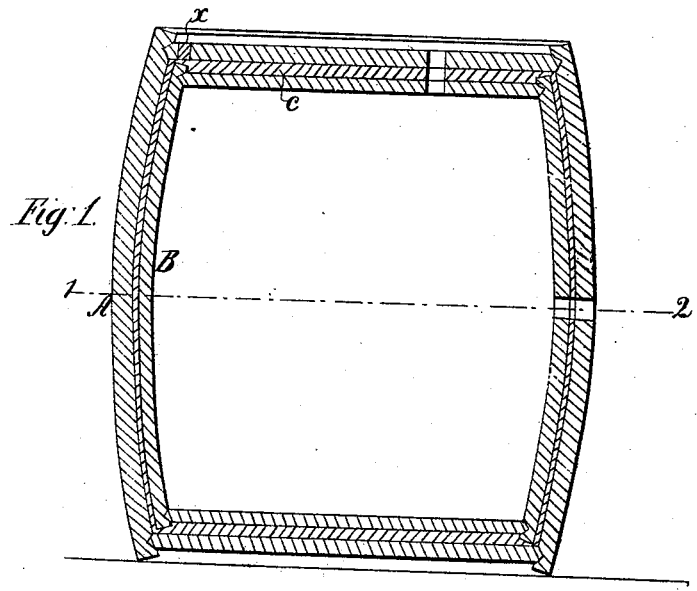
Figure 2:
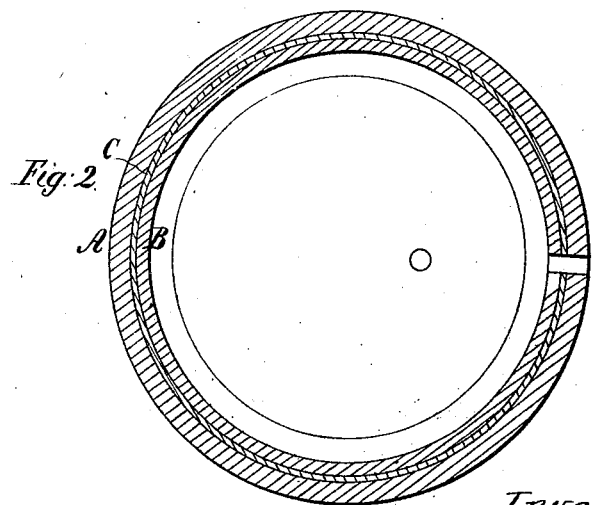

On reference to the accompanying drawings, which form a part of this specification, Figure 1 is a vertical section of my improved oil-barrel, and Fig. 2 a transverse section on the line 1 2, Fig. 1.

A is a barrel or casing, within which is a smaller barrel or casing, B, the latter corresponding in form with the outer casing, and being suspended in any suitable manner within the same, so that the space between the two shall be of about equal width at all points. When the inner case has been suspended in this manner, one or more openings, $x$, are made in the upper head of the outer case, A, and through these openings is introduced into the space between the two casings a mixture of melted roof-cement and coal-tar, which, on cooling, forms an unbroken casing of solid yielding material impervious to oil or other materials usually deposited in barrels. The opening $x$ is then closed, and such openings as may be necessary for the introduction of liquids into the barrel are made in the same at the proper points.

A barrel of this character is specially adapted for the reception of coal-oil and other light or volatile oils, as it will be seen that the mass of cement surrounds the inner case, and completely closes all crevices, thus preventing the escape of the contents, while the material of which the inner barrel is composed will effectually prevent the contents from coming in contact with the cement and dissolving or otherwise injuriously affecting the latter.

It will be apparent that the strength imparted by the cement will enable me to use much lighter material in the manufacture of the barrels or cases A and B than what would otherwise be required.

Although I prefer to use roofing-cement for the purpose of filling the space between the two barrels, it will be apparent that any other suitable material may be used without affecting the main object of my invention.

I claim as my invention and desire to secure by Letters Patent—

A barrel composed of the outer casing, A, and the inner casing, B, in combination with an intervening body of cement or equivalent material, substantially as specified.

In testimony whereof I have signed my name to this specification in the presence of two subscribing witnesses.

JAMES HOLLAND.

Witnesses:
CHARLES E. FOSTER,
JOHN WHITE.